United States Patent
Brandwine

(10) Patent No.: US 10,798,120 B2
(45) Date of Patent: *Oct. 6, 2020

(54) DYNAMIC DETECTION OF FIREWALL MISCONFIGURATIONS

(71) Applicant: Amazon Technologies, Inc., Reno, NV (US)

(72) Inventor: Eric Jason Brandwine, Haymarket, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/414,398

(22) Filed: May 16, 2019

(65) Prior Publication Data
US 2019/0273757 A1 Sep. 5, 2019

Related U.S. Application Data

(63) Continuation of application No. 15/276,210, filed on Sep. 26, 2016, now Pat. No. 10,375,103.

(51) Int. Cl.
*H04L 29/06* (2006.01)
(52) U.S. Cl.
CPC ...... *H04L 63/1433* (2013.01); *H04L 63/0236* (2013.01)
(58) Field of Classification Search
CPC ............. H04L 63/1433; H04L 63/0263; H04L 63/029; H04L 63/0227
See application file for complete search history.

(56) References Cited

U.S. PATENT DOCUMENTS

| | | | |
|---|---|---|---|
| 7,099,941 B1* | 8/2006 | Massengill | H04L 43/00 379/142.01 |
| 7,904,533 B1* | 3/2011 | Gonzalez | H04L 41/507 370/229 |
| 2007/0289017 A1* | 12/2007 | Copeland, III | H04L 41/50 726/23 |
| 2013/0185404 A1* | 7/2013 | Patel | H04L 61/2557 709/222 |
| 2017/0041289 A1* | 2/2017 | Braudes | G06F 8/62 |

OTHER PUBLICATIONS

Non-Final Office Action issued in U.S. Appl. No. 15/276,210 dated Aug. 10, 2018.
Notice of Allowance issued in U.S. Appl. No. 15/276,210 dated Mar. 27, 2019.

* cited by examiner

*Primary Examiner* — Vance M Little
(74) *Attorney, Agent, or Firm* — Hogan Lovells US LLP

(57) ABSTRACT

An automated scanning service can be configured to dynamically determine potential firewall misconfigurations in a shared resource environment. The scanning service can interrogate one or more application programming interfaces (APIs) to determine the state of the relevant firewall ports. For each firewall port in a permitted state, a test or trace can be run to determine whether the corresponding host port is open. Similarly, information can be obtained indicating which host ports for the allocation are open, and a determination can be made as to whether the corresponding firewall ports are permitted. Once the determinations are made, any mismatch in port state can be reported as a potential misconfiguration.

20 Claims, 6 Drawing Sheets

DYNAMIC DETECTION OF FIREWALL MISCONFIGURATIONS

CROSS-REFERENCE TO RELATED APPLICATION

This application is a continuation of U.S. application Ser. No. 15/276,210, entitled "DYNAMIC DETECTION OF FIREWALL MISCONFIGURATIONS," filed Sep. 26, 2016; which is incorporated herein by reference for all purposes.

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. It can be difficult, however, to ensure that all the resources are properly configured in such an environment, particularly as the usage evolves over time. As an example, there may be port settings on a firewall that end up being different from the port settings on a corresponding host machine allocated to a customer as part of a resource allocation. While some of these differences may be intentional, the differences can also be indicative of a potential misconfiguration. Since it is difficult to determine which ports should be open on the host machine, or a customer may not want to share that information, it can be difficult to identify potential misconfigurations.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can attempt to dynamically determine potential firewall misconfigurations. In particular, a scanning service can be configured to determine whether corresponding firewall and host ports for a customer allocation have the same or different states, and report instances of different states as potential misconfigurations. As part of such a process, the scanning service can interrogate one or more application programming interfaces (APIs) for a programmatic virtual network, or sub-network, of a customer resource allocation to determine the state of the relevant firewall ports. For each firewall port with a permitted state, meaning traffic is permitted to pass through the firewall port, a test or trace can be run to determine whether the corresponding host port is open. Similarly, information can be obtained indicating which host ports for the allocation are open, and a test or trace can be performed for each open host port to determine whether the corresponding firewall port is in a permitted state. If the firewall port state can be determined through API interrogation then the testing in this direction may not be required. Once the determinations are made in one or both directions, any mismatch in port state can be reported as a potential misconfiguration on a customer allocation. A mismatch as referred to herein corresponds to where traffic is either allowed, corresponding to an open host port or a firewall port in a permitted state, or where traffic is disallowed, such as for a closed host port or a firewall port in a denied state. For simplicity of explanation, an open host port will be described as having the same state as a permitted state firewall port, and an open host post will be described as having a different state than a denied state firewall port. Similar language holds true for other matched or mismatched combinations as well.

Various other functions can be implemented within the various embodiments as well as discussed and suggested elsewhere herein.

Figure 1:
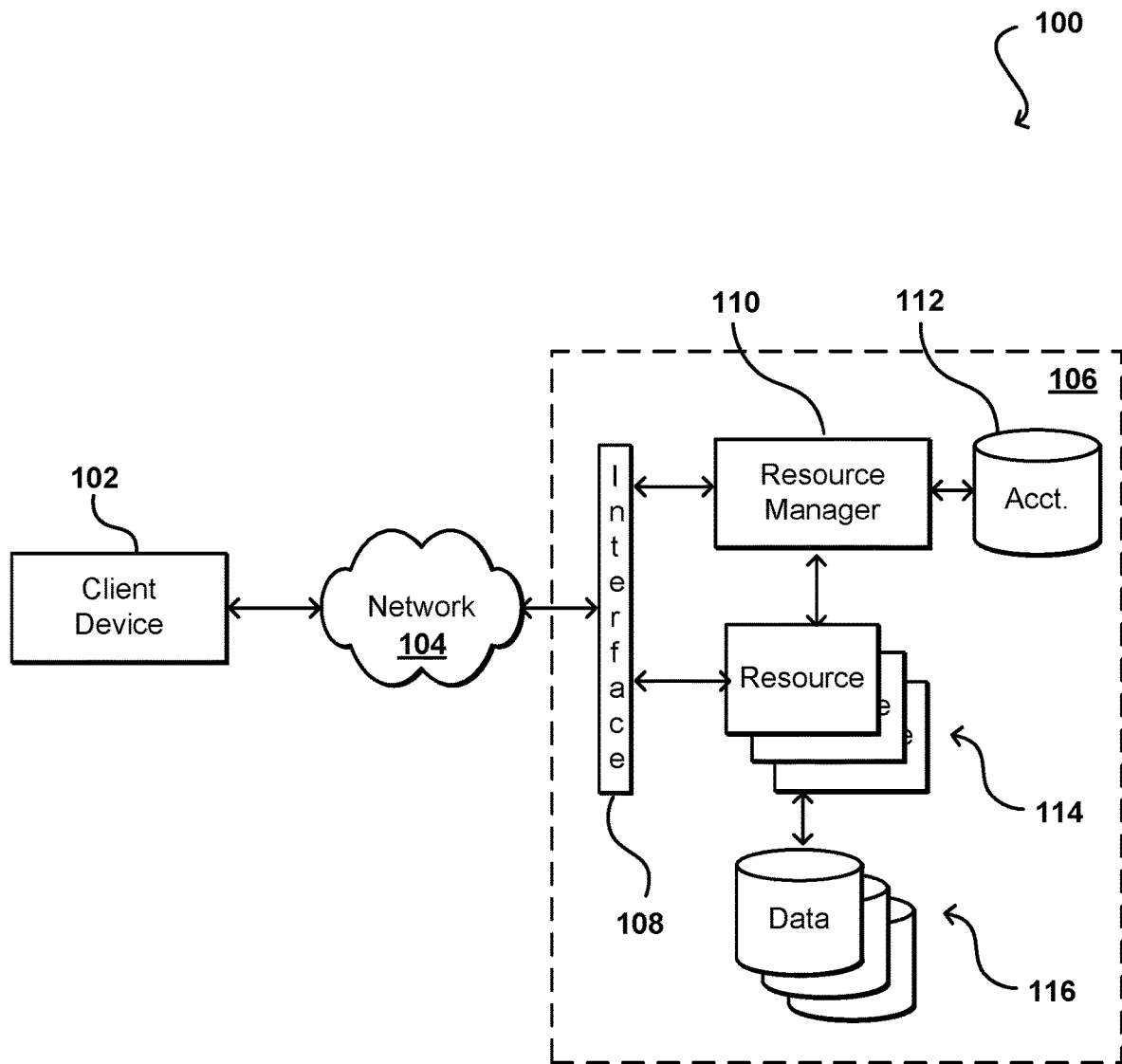
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Unlike many conventional environments, the resource manager and other such components in such a programmatically-controlled environment can provide significant visibility into the operation of the environment infrastructure. Unfortunately, the resource manager often will not be able to gain visibility or insight into the operation of a particular resource, physical or virtual, that has been allocated for use by a particular customer. As an example, a resource provider is often unable to determine which ports should be open or closed on a particular host machine, whether a physical or virtual host allocated to a customer. In certain environments a set of log data can be generated that indicates when packets have been passed or denied by a host-based firewall, such as may be used to implement security groups. It is difficult for the provider to determine, however, how those firewall rules align with the execution of the host machine or machine instance, where the machine is a virtual machine operating on a physical host and that host can execute multiple concurrent "instances" of a virtual machine on behalf of the same, or different, customers.

A potential misconfiguration in such an environment corresponds to a firewall that permits traffic to a closed port on a host machine. If at any point a customer executes a service on that host port, the service can be exposed to an external entity or network by the port with the permitted state, or "hole," in the corresponding firewall. As mentioned, in some instances this can correspond to a valid state, such as where the customer has taken down a web server for maintenance and will eventually be restarting the server. In such a situation a permitted state port (e.g., TCP port 80) in a firewall may make sense even where port 80 on the web server, or host machine, is presently closed. In other cases, however, this may be a misconfiguration for which the customer should be notified in order to avoid any unintended access or exposure. As mentioned, it may not be possible for the resource provider to log into, or otherwise access, the machine instance to determine whether or not a service should be actively listening on a particular port. While a customer might be willing to execute an agent or other component or process for reporting that information, not all customers will be willing to provide that information or support such an agent.

Accordingly, approaches in accordance with various embodiments can attempt to identify potential misconfigurations by sending test packets to various ports and monitoring the responses received. For any instance where an expected response is not received, or where an unexpected response is received, a notification can be provided indicating that there is a potential misconfiguration resulting in this mismatch. A port scanning service, or other such system or service, can be configured to probe the various ports to determine whether corresponding ports are open or closed, or if there is a mismatch in state. The packets or test messages can be sent from an outside network or environment, a different sub-environment, or from within a sub-environment, among other such options.

Figure 2:
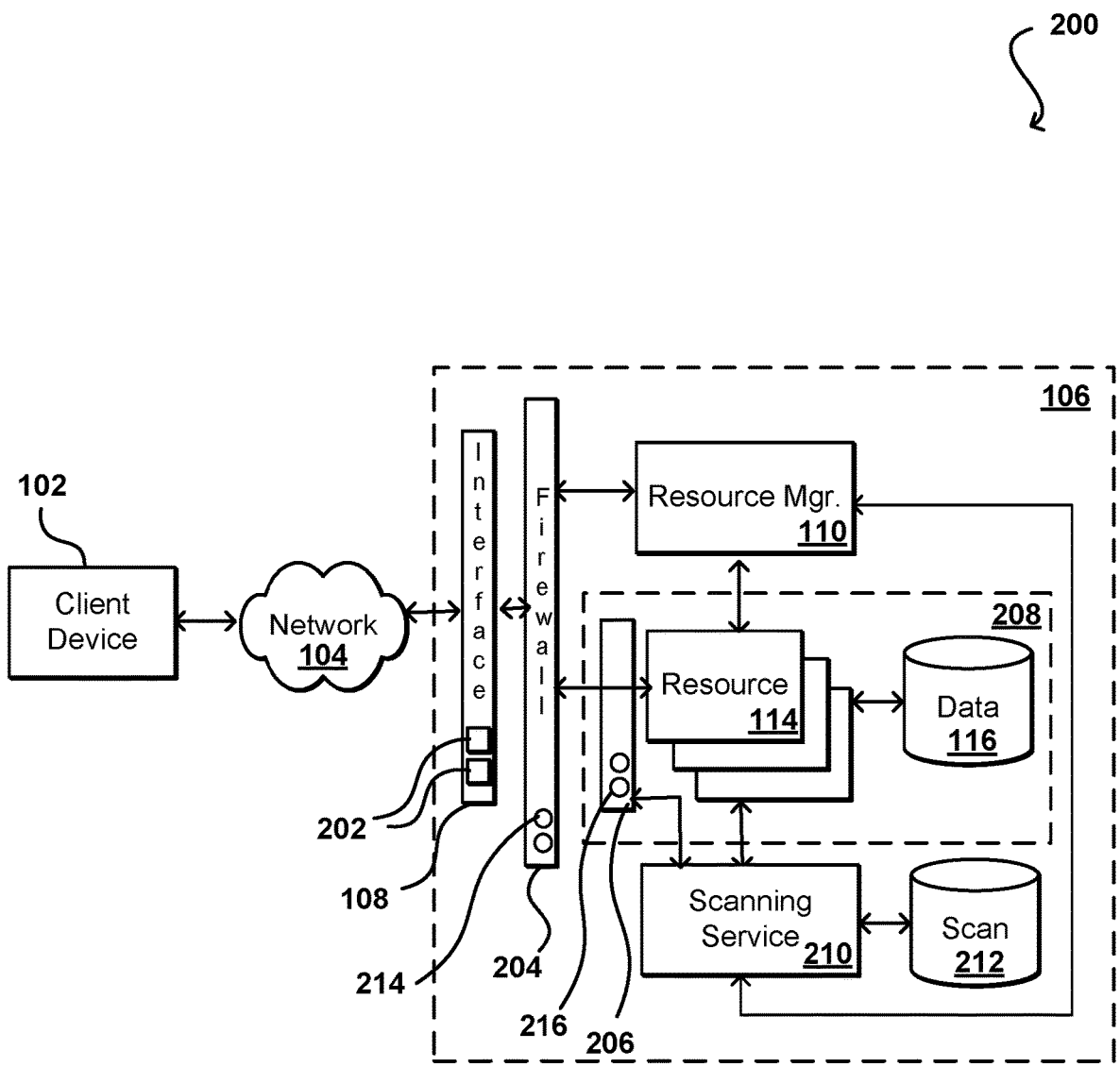
FIG. 2 illustrates a first example configuration that can be used to determine potential firewall misconfigurations in accordance with various embodiments.

FIG. 2 illustrates an example system configuration 200 that can be used to implement aspects of various embodiments. It should be understood that reference numbers for similar elements may be carried over between figures for simplicity of explanation, but such usage should not be interpreted as a limitation on the scope of the various embodiments unless otherwise specifically stated. In this example, a client device 102 associated with a customer can again make a call across one or more networks 104 to be received by a resource provider environment 106. In this example, the interface layer 108 can include a set of interfaces, such as application programming interfaces (APIs), that enable the client device to obtain specific information about the network. This information can include setting or state information for a set of ports 204 of one or more firewalls operating in the provider environment 106. These can include a firewall 204 for the resource provider environment in general, or a firewall 206 that is specific to a customer allocation or specific host machine, among other such options. A customer can submit a request to the appropriate API to interrogate the firewall and obtain the state of one or more specified ports, or any relevant port. These APIs can also be utilized by systems or services within the resource provider environment, such as the resource manager 110 or a configuration scanning service 210, among other such options. Thus, while the APIs 202 are shown as part of the interface layer 202 sitting outside the firewall 204 in this example, it should be understood that similar APIs may be present inside the firewall, or otherwise accessible to components of the resource provider environment 106.

A customer can take advantage of the APIs to directly determine port information, or can contact a configuration scanning service 210 or other such offering to utilize the port information to determine potential misconfigurations. In the example of FIG. 2, a client request can be received to the scanning service 210, which can work with a resource manager 110, control plane manager, or other such system to determine resources 114 allocated to the customer that correspond to the request. This can include resources in a particular sub-network 208 or other set of allocated resources in the provider environment. As known for such environments, the allocated resources can include virtual resources that occupy portions of physical resources, where other portions of those physical resources may be allocated to different customers.

In this example, the scanning service can determine any firewall port 214, 216 through which traffic from across the network(s) 104 would need to pass in order to be received to one of the customer-allocated resources 114. As mentioned, the ports can be for a general environment firewall 108, or a firewall specific to a customer sub-network 208 or specific host instance, among other such options. The scanning service can interrogate the appropriate API(s) to determine the state (e.g., permitted or denied) of each relevant port. For each permitted state firewall port that would enable traffic to be directed to the relevant customer resource(s), the scanning service can cause a data packet to be sent through each of the permitted firewall ports. If the host port is open, then an acknowledgement or other such response should be received. If both the firewall and corresponding host port are open or permitted, then the configuration for those ports is likely correct. If the host port is closed then either no response will be received or a bounce back, reset, or error response may be received. A closed host port corresponding to a permitted firewall port can be indicative of a potential misconfiguration. For such a potential misconfiguration, data for the mismatch can be logged for subsequent analysis or reporting, such as to a scan data repository 212 or other such location, or a notification can be provided to the corresponding customer, among other such options. In some embodiments a notification or report can be provided regardless of the findings, or a notification might be provided only when a potential mismatch is detected, among other such options.

The ability to detect misconfigurations by sending packets through firewall ports in the permitted state only addresses around half of the potential mismatches, however, as packets cannot be sent through denied state firewall ports even if the corresponding host ports are open. Accordingly, the scanning service 210 in this example can attempt to determine which ports are open on the host machines or other client-allocated resources 114. This can include the scanning service communicating with an agent operating for the customer allocation or querying a data repository or file storing the port configuration data, among other such options. The scanning service can attempt to send packets through the corresponding firewall ports, or at least interrogate the APIs for those firewall ports, in order to detect any mismatches where the firewall ports are denied. In some embodiments where the scanning service 210 interrogates the appropriate API(s) to determine the states of the relevant firewall ports, this information will already be available such that the scanning service can simply compare this list of port states to the information for open ports on the host machines for the customer allocation 208. In situations where a firewall port is in a denied state but the corresponding host port is open, for example, data for the mismatch can be logged for subsequent analysis or reporting, such as to the scan data repository 212 or other such location as discussed previously, or a notification can be provided to the corresponding customer, among other such options.

In some embodiments, the relevant customer allocation or sub-environment 208 can correspond to a security group (or other virtual network), where access to the resources of the security group requires permission or credentials relevant for that security group. There can also be relevant rules, policies, roles, or other criteria or guidelines relevant to a particular security group as known in the art for such purposes. The scanning service 210 can then, when scanning resources for a security group, determine the relevant firewall and host ports, and determine which ports are reachable and/or listening with respect to that security group.

Figure 3:
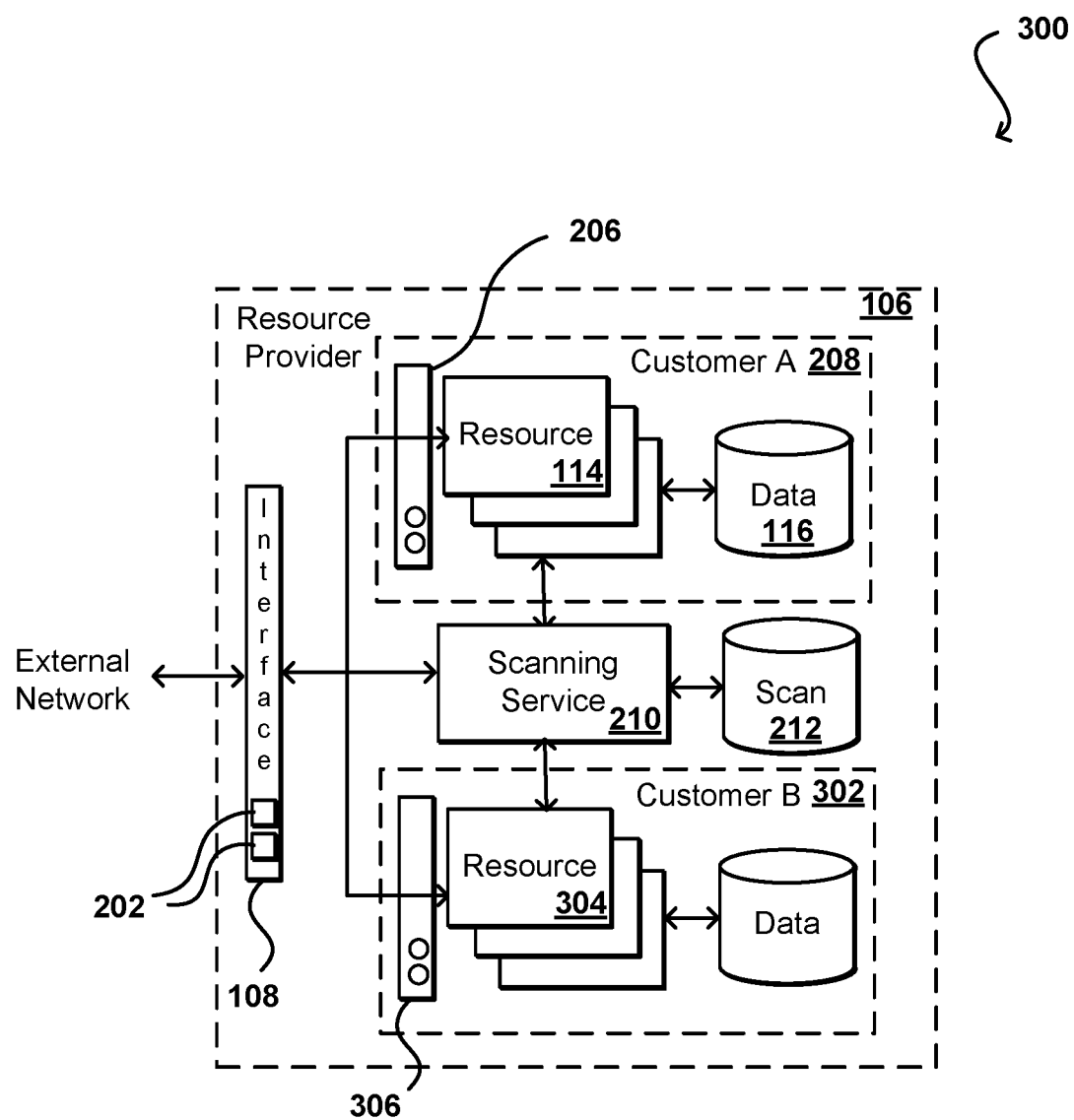
FIG. 3 illustrates a second example configuration that can be used to determine potential firewall misconfigurations in accordance with various embodiments.

The ability to interrogate firewall port data for various security groups or other customer allocations can also enable detecting potential misconfigurations within the resource provider environment 106 as well. For example, in the example system configuration 300 of FIG. 3 there are two different customer allocations 208, 302 of resources 114, 304. These can be allocations to different customers, or different allocations to the same customer, among other such options. In this example the scanning service 210 can interrogate the ports on the firewall 206, 306 for either security group, and an perform operations to determine potential mismatches for either security group, as well as mismatches between security groups if for the same customer or similar offerings. The scanning service can trace or simulate traffic within the resource provider environment 106 or between security groups 208, 302, as well as from outside the security provider environment. Each security group 208, 302 can be a separate programmatically-controlled virtual network that is accessible via at least one corresponding API. It should be apparent that security groups and customer allocations are just examples of sources within an environment, and that any appropriate system, service, component, or layer can be examined as well within the scope of the various embodiments.

As mentioned, in some embodiments the scanning may be performed in response to a customer request. In other embodiments the scan might occur automatically, such as at regular intervals or specified times. In yet other embodiments the scans might occur as a result of a specified type of event, action, or occurrence. For example, a change in a security group or launching of a new host instance might trigger a configuration scan. Such an event can cause the scanning service to determine the potentially affected security groups or allocations, determine the ports that should be reachable, and attempt to detect any potential misconfigurations. The notifications of potential mismatches could be provided in any of a number of different ways, such as by an instant message, email message, synchronous API call response, and the like.

In some embodiments a customer can submit a request that is more general in nature with respect to their allocation(s). For example, a customer can submit a request to determine any misconfigurations that are reachable from the Internet or another public or external network. A customer might also request information about any potential misconfigurations in a particular sub-network that are reachable from a different sub-network. The scanning service can then trace the network or environment from the potential source location(s) to the target destination location(s), and report on any potential mismatches. A trace through the environment might identify any relevant router, routing table, network access control list, firewall, or other potential filtering mechanism that could potentially prevent network traffic from reaching an open destination port, or any of these mechanisms that might allow network traffic to arrive at a closed destination port. A list can be generated mechanically by simulating the packet flow of all potential filters for a data packet between a source and a destination, and those filters can be mechanically checked against the traffic. For a general network or sub-network a source IP or address can be selected at random from the applicable range as a starting point for a relevant trace. A determination can then be made as to whether a packet would arrive at its target destination.

In some embodiments a resource manager or other such system or service can attempt to take action to remedy a potential mismatch. As mentioned, in some instances a mismatch may be intentional so it might not be advisable to automatically open or close a port without customer approval. In cases where the customer provides or exposes the intended configuration, however, automatic adjustments can be made where misconfigurations are detected. Such an approach would require the customer to keep the exposed information current and accurate, however, in order to prevent any unintended actions being automatically taken in response to a different configuration being detected. In some embodiments customers may be able to provide rules or policies as to actions that should be taken in response to detecting specific type of mismatches or mismatches for certain types of resources, etc. In still other embodiments recommended changes may be surfaced to a customer or administrator, and an option can be provided to make any or all of the recommended changes. A customer can also specify certain changes that are able to be performed automatically and other changes where a notification or suggestion should be provided, among other such options.

Figure 4:
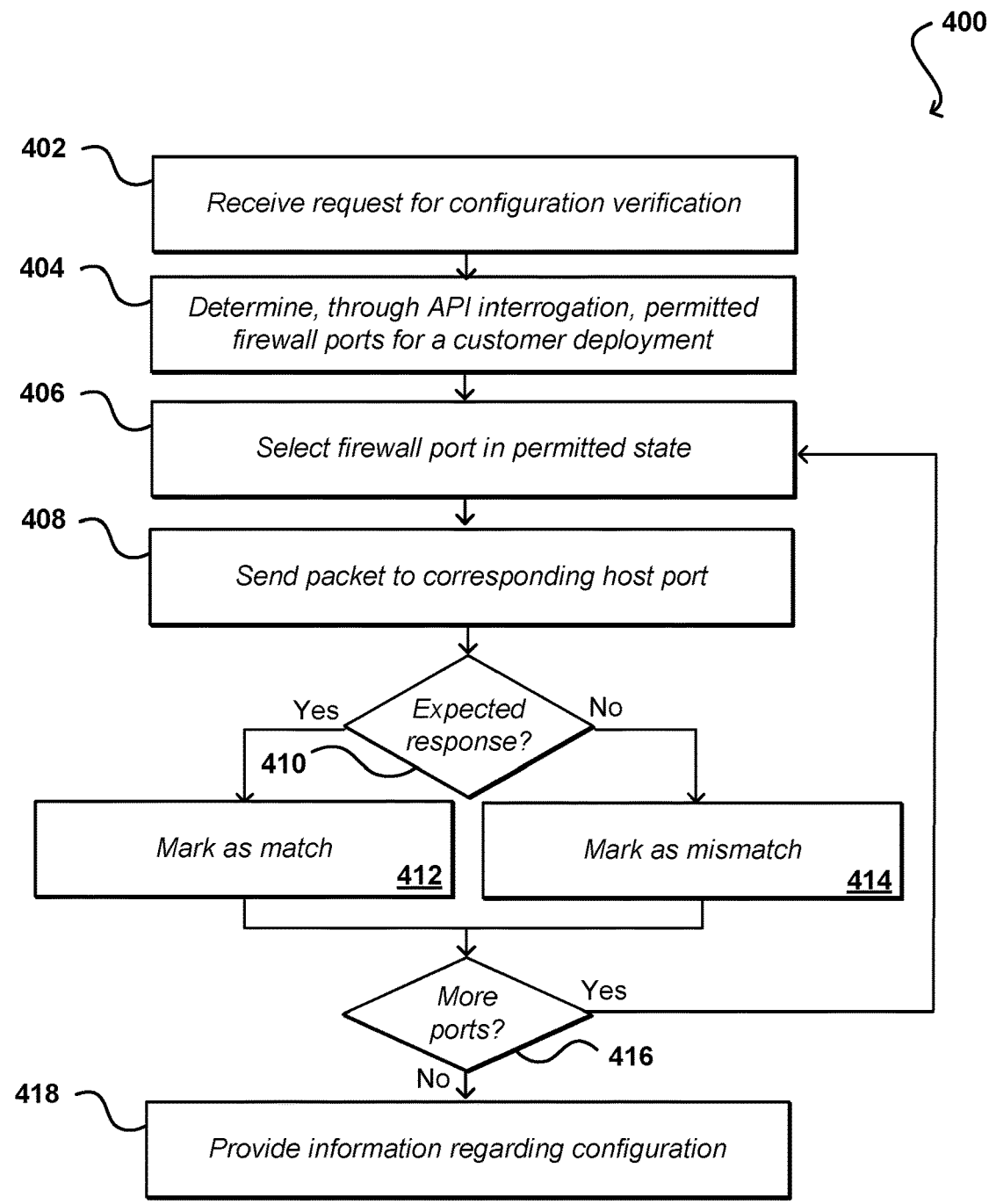
FIG. 4 illustrates a first example process for determining potential firewall misconfigurations that can be utilized in accordance with various embodiments.

FIG. 4 illustrates an example process 400 for detecting potential firewall misconfigurations that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request for configuration verification is received 402. As mentioned, this could be received from a customer, received from an automated process, or received in response to a detected event, among other such options. In this example, a scanning service or other such system can attempt to determine 404, through API interrogation, the permitted state firewall ports for a specific customer deployment or allocation, as may correspond to a sub-network or security group as discussed herein. From the set of permitted firewall ports, a specific port can be selected 406 for testing. A test packet can be sent 408, or simulated, through to the corresponding port on the host machine or other allocated resource. The packet can be sent through the permitted state firewall port or via another path through the system that is able to determine a state of the corresponding host port. A determination can be made 410 as to whether an expected response, such as an acknowledgement, is received. If an acknowledgement or other response is received that indicates that the host port is open, then the respective port configuration can be marked 412 or otherwise designated as a match, or likely proper configuration. If no response is detected for at least an allocated amount of time, or if an error message or bounce back is received, then the port configuration can be marked 414 or otherwise designated as a mismatch. A determination can be made 416 as to whether there are more permitted firewall ports to be analyzed for the allocation. If so, the process can continue. Once all permitted state firewall ports have been analyzed, or at another appropriate time, information regarding the configuration can be provided 418 and/or stored for subsequent analysis. As mentioned, in some embodiments the customer might only be notified in the case of a mismatch, while in other embodiments the customer might always be provided with the results of the scan, among other such options.

Figure 5:
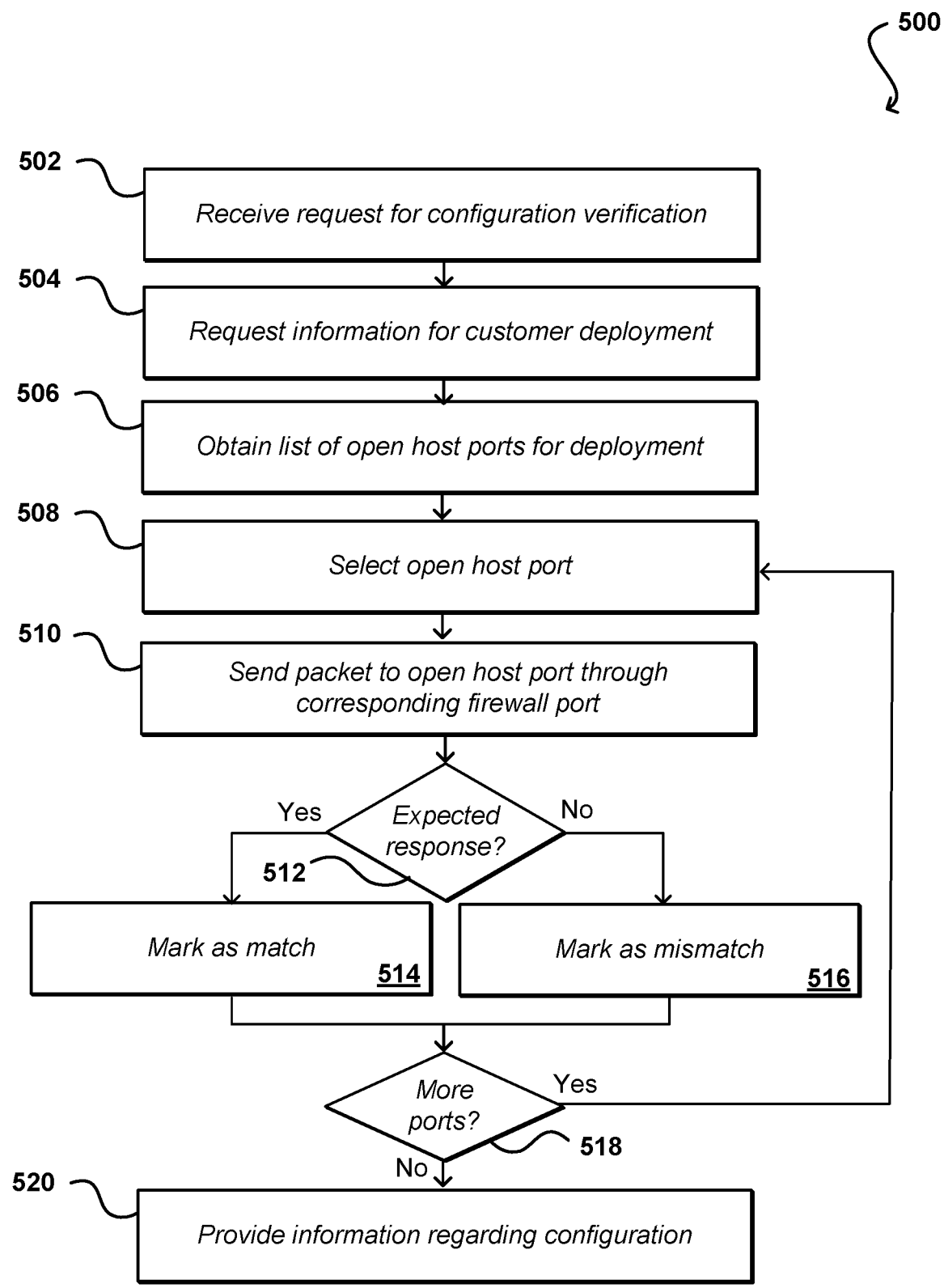
FIG. 5 illustrates a second example process for determining potential firewall misconfigurations that can be utilized in accordance with various embodiments.

FIG. 5 illustrates another example process 500, or portion of the same process, that can be performed in accordance with various embodiments. In this example, a request for configuration verification is received 502 as discussed previously. In this example, however, the process will focus on determining the open (or closed) ports for a customer allocation, such as host ports, and then testing to determine whether the corresponding firewall port is in a permitted or denied state. In this example a system or service, such as a scanning service, can request 504 information for the relevant customer deployment or allocation, such as a sub-network or security group as discussed elsewhere herein. This can include, for example, querying a customer agent or analyzing a customer configuration file, among other such options. As a result, the service can obtain 506 a list of open host ports (or other relevant ports) for the deployment.

From the set of open host ports, a specific firewall port can be selected 508 for testing. A test packet can be sent 510, or simulated, through the permitted state firewall port to the corresponding port on the host machine or other allocated resource. A determination can be made 512 as to whether an expected response, such as an acknowledgement or other appropriate response, is received. If an acknowledgement or other response is received that indicates that the host port is open and accessible through the corresponding firewall port, then the respective port configuration can be marked 514 or otherwise designated as a match, or proper configuration. If no response is detected for at least an allocated amount of time, or if a bounce back is received, then the port configuration can be marked 516 or otherwise designated as a mismatch. As mentioned, in some embodiments testing is not required where the firewall port state can be interrogated through an API and compared against the host port state for an allocation. A determination can be made 518 as to whether there are more open host ports to be analyzed for the allocation. If so, the process can continue. Once all open host ports have been analyzed, or at another appropriate time, information regarding the configuration can be provided 520 and/or stored for subsequent analysis.

Figure 6:
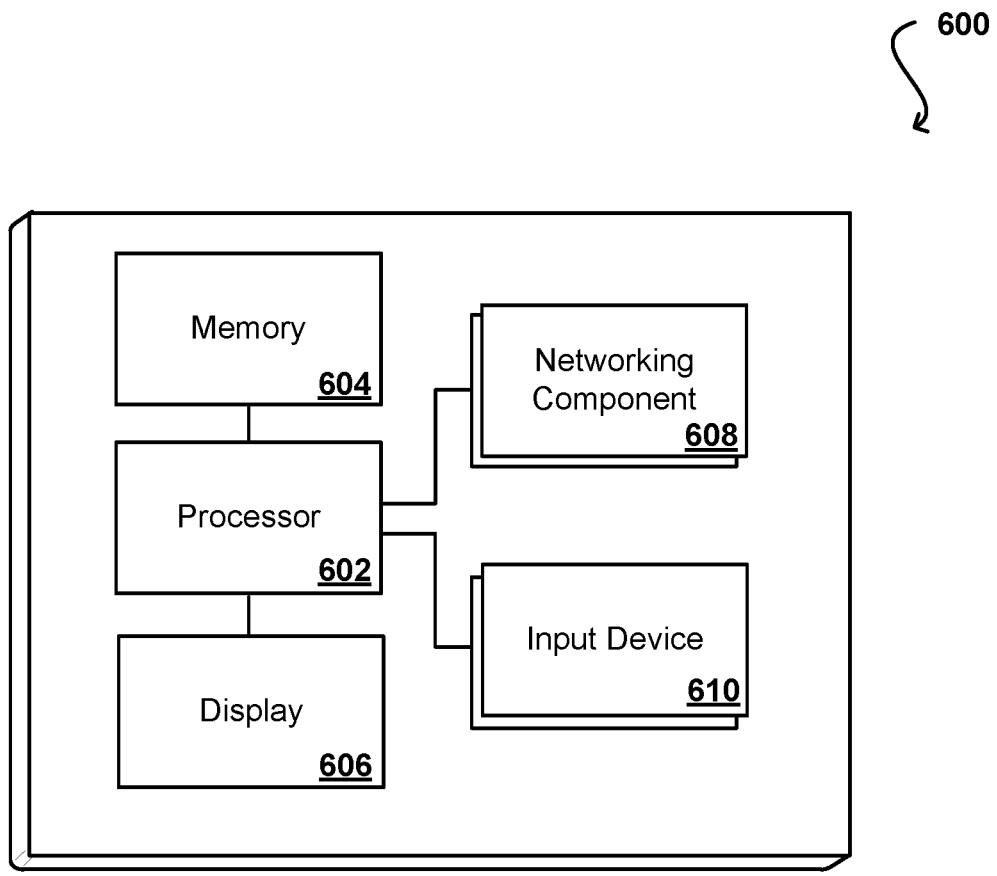
FIG. 6 illustrates example components of a computing device that can be used to implement aspects of the various embodiments.

FIG. 6 illustrates a set of basic components of an example computing device 1000 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a request to verify a configuration of a firewall port associated with a customer allocation of resources in a resource provider environment, the customer allocation including at least one virtual host machine and a corresponding host port;
    obtaining, via at least one application programming interface (API) for the customer allocation, firewall state information for the firewall port, the firewall state information indicating either a permitted state or a denied state for the firewall port;
    determining the firewall port is in the permitted state;
    sending, through the firewall port, a test packet to the host port;
    determining that an acknowledgement was not received for the test packet, thereby indicating that the host port is in a closed state; and
    providing a notification regarding a mismatch between the permitted state of the firewall port and the closed state of the host port, the mismatch being indicative of a potential misconfiguration.

2. The computer-implemented method of claim 1, further comprising:
    providing the customer allocation using a plurality of virtual resources executed using physical resources of the resource provider environment, the customer allocation forming a programmatically-controllable virtual environment.

3. The computer-implemented method of claim 1, further comprising:
    configuring a scanning service to periodically verify the configuration of the firewall port, wherein the request to verify is received by the scanning service or generated by the scanning service.

4. The computer-implemented method of claim 1, further comprising:
    determining host port state information by at least one of contacting an agent associated with the customer allocation or analyzing a state file generated by the customer allocation.

5. A computer-implemented method, comprising:
    determining a firewall port associated with a resource port in a resource environment, the resource environment including at least one virtual resource executed using one or more physical resources of the resource environment;
    obtaining, via at least one application programming interface (API) for the resource environment, firewall state information for the firewall port, the firewall state information indicating either a permitted state or a denied state;
    determining resource state information for the resource port, the resource state information indicating either an open state or a closed state; and
    generating a notification in response to a mismatch between the firewall state information and the resource state information, the mismatch indicative of a potential misconfiguration.

6. The computer-implemented method of claim 5, wherein the mismatch is one of either: (i) the firewall state information indicating a permitted state and the resource state information indicating a closed state and, or (ii) the firewall state information indicating a denied state and the resource state information indicating an open state.

7. The computer-implemented method of claim 5, wherein the firewall port is one of a set of firewall ports and the resource port is one of a set of resource ports, and further comprising:
    determining whether the corresponding firewall port for each resource port, with the open state, also has the permitted state.

8. The computer-implemented method of claim 5, wherein determining the resource state information includes contacting an agent associated with the set of resource ports or analyzing a state file generated for the set of resource ports.

9. The computer-implemented method of claim 7, wherein determining whether the firewall port for each resource port, with the open state, also has the permitted state includes one of sending a test packet through the corresponding firewall port, performing a network trace for a corresponding network port, or analyzing the firewall state information obtained via the API.

10. The computer-implemented method of claim 9, wherein the test packet or the network trace is sourced from an external network, an internal network, or a separate sub-network of a programmatically-controllable resource environment.

11. The computer-implemented method of claim 9, further comprising:
    determining whether the test packet or the network trace for a firewall port is filtered by any other component of the programmatically-controllable resource environment such that the test packet or the network trace does not reach the corresponding resource port; and generating a notification in response to the test packet or the network trace being determined to be filtered.

12. The computer-implemented method of claim 5, further comprising:
generating a notification regardless of whether there is a mismatch between the firewall state information and the resource state information.

13. The computer-implemented method of claim 5, wherein the mismatch is determined automatically or periodically as part of a scanning service, or manually in response to a request received from a customer associated the firewall port.

14. The computer-implemented method of claim 5, further comprising:
automatically adjusting a state of the firewall port in response to the mismatch.

15. A configuration scanning system, comprising:
at least one processor; and
memory including instructions that, when executed by the at least one processor, cause the system to:
determine a firewall port associated with a resource port in a resource environment, the resource environment including at least one virtual resource executed using one or more physical resources of the resource environment;
obtain, via at least one application programming interface (API) for the resource environment, firewall state information for the firewall port, the firewall state information indicating either a permitted state or a denied state;
determine resource state information for the resource port, the resource state information indicating either an open state or a closed state; and
generate a notification in response to a mismatch between the firewall state information and the resource state information, the mismatch indicative of a potential misconfiguration.

16. The configuration scanning system of claim 15, wherein the mismatch is one of either: (i) the firewall state information indicating a permitted state and the resource state information indicating a closed state and, or (ii) the firewall state information indicating a denied state and the resource state information indicating an open state.

17. The configuration scanning system of claim 15, wherein the firewall port is one of a set of firewall ports and the resource port is one of a set of resource ports, and further comprising:
determining whether the corresponding firewall port for each resource port, with the open state, also has the permitted state.

18. The configuration scanning system of claim 15, wherein determining the resource state information includes contacting an agent associated with the set of resource ports or analyzing a state file generated for the set of resource ports.

19. The configuration scanning system of claim 17, wherein determining whether the firewall port for each resource port, with the open state, also has the permitted state includes one of sending a test packet through the corresponding firewall port, performing a network trace for a corresponding network port, or analyzing the firewall state information obtained via the API.

20. The configuration scanning system of claim 15, wherein the test packet or the network trace is sourced from an external network, an internal network, or a separate sub-network of a programmatically-controllable resource environment.

* * * * *